United States Patent
Fujimura

(10) Patent No.: US 9,595,261 B2
(45) Date of Patent: Mar. 14, 2017

(54) PATTERN RECOGNITION DEVICE, PATTERN RECOGNITION METHOD, AND COMPUTER PROGRAM PRODUCT

(71) Applicant: KABUSHIKI KAISHA TOSHIBA, Minato-ku, Tokyo (JP)

(72) Inventor: Hiroshi Fujimura, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 22 days.

(21) Appl. No.: 14/644,403

(22) Filed: Mar. 11, 2015

(65) Prior Publication Data
US 2015/0269940 A1 Sep. 24, 2015

(30) Foreign Application Priority Data
Mar. 20, 2014 (JP) .................. 2014-058932

(51) Int. Cl.
G10L 15/00 (2013.01)
G10L 17/26 (2013.01)
(52) U.S. Cl.
CPC .................. *G10L 17/26* (2013.01)
(58) Field of Classification Search
USPC ................................ 704/246–252
See application file for complete search history.

(56) References Cited

U.S. PATENT DOCUMENTS 5,857,169 A * 1/1999 Seide .............. G10L 15/14 704/221
8,280,726 B2 10/2012 Mao et al.
2003/0059106 A1 * 3/2003 Gutta .............. G06K 9/6273 382/158

FOREIGN PATENT DOCUMENTS

| JP | 2002-236494 | 8/2002 |
|----|-------------|--------|
| JP | 2009-109712 | 5/2009 |
| JP | 2011-181021 | 9/2011 |

OTHER PUBLICATIONS

Nisimura, Ryuichi, et al.; A proposal of identifying children and adults from the speech based on DNN for voice-enabled web system; Mar. 2014; pp. 139-140; Wakayama University.
Sas, Jerzy, et al.; Gender Recognition using Neural Networks and ASR Techniques; Journal of Medical Informatics & Technologies; 2013; pp. 179-187; vol. 22; ISSN 1642-6037.

(Continued)

*Primary Examiner* — Leonard Saint Cyr
(74) *Attorney, Agent, or Firm* — Amin, Turocy & Watson LLP

(57) ABSTRACT

According to an embodiment, a pattern recognition device includes a signal processor, a first recognizer, a detector, and a second recognizer. The signal processor is configured to calculate a feature of a time-series signal for each frame. The first recognizer is configured to recognize which of a leaf class and a single class of a first class group the time-series signal belongs to for each frame based on the feature and output a recognition result. The detector is configured to detect a segment including a first target class on the basis of a sum of probabilities of the leaf classes which the frame belongs to on the basis of the recognition results for each frame. The second recognizer is configured to recognize which of second target classes the segment belongs to on the basis of the recognition results for the frames within the segment.

16 Claims, 4 Drawing Sheets

(56) References Cited

OTHER PUBLICATIONS

Hinton, Geoffrey, et al.; Deep Neural Networks for Acoustic Modeling in Speech Recognition; IEEE Signal Processing Magazine; Nov. 2012; pp. 82-97; IEEE.
Kida, Yusuke, et al.; Robust F0 Estimation Based on Log-Time Scale Autocorrelation and Its Application to Mandarin Tone Recognition; Interspeech 2009 Brighton; Sep. 6-10, 2009; pp. 2971-2974; ISCA; Brighton UK.
Crammer, Koby, et al.; On the Algorithmic Implementation of Multiclass Kernel-based Vector Machines; Journal of Machine Learning Research 2; 2001; pp. 265-292.
Zhu, Ji, et al.; Multi-class AdaBoost*; Statistics and Its Interface; 2009; pp. 349-360; vol. 2.
Hermansky, Hynek; RASTA Processing of Speech; IEEE Transactions on Speech and Audio Processing; Oct. 1994; pp. 578-589; vol. 2, No. 4; IEEE.

* cited by examiner

PATTERN RECOGNITION DEVICE, PATTERN RECOGNITION METHOD, AND COMPUTER PROGRAM PRODUCT

CROSS-REFERENCE TO RELATED APPLICATION

This application is based upon and claims the benefit of priority from Japanese Patent Application No. 2014-058932 filed on Mar. 20, 2014; the entire contents of which are incorporated herein by reference.

FIELD

Embodiments described herein relate generally to a pattern recognition device, a pattern recognition method, and a computer program product.

BACKGROUND

There is known a pattern recognition device (speaker attribute recognition device) which determines a gender by voice. Such device performs recognition of a male, female, or silence segment on each frame provided by extracting a sound waveform corresponding to a fixed period, and uses the recognition result of each frame to perform recognition by counting the number of frames determined to correspond to each of the male and female.

The following device has been proposed as well. First, a sound feature of each of a male, a female and silence is modeled in advance by mixed GMMs (Gaussian mixture Models) so that a voice feature is calculated for each frame that is provided by extracting a sound waveform corresponding to a fixed period. Next, the mixed GMMs are used to perform pattern matching on the male, female and silence so that the larger of the likelihood of male and female and the likelihood of the silence are used to detect a series of voice segments (voice segments) including a short period of silent pause, the calculated likelihoods of male/female are added up for the series of voice segments, and the likelihoods are compared to detect a segment and perform gender recognition by a single recognizer for the frame.

However, in the related art where the detection of the voice segment and the recognition of the speaker attribute corresponding to the segment are performed by using the result output from the single recognizer of the frame that is provided by extracting the sound waveform corresponding to the fixed period, the recognition problem pertaining to the frame is solved by comparing the likelihood of the generated models and has not been solved directly by using a probability. Moreover, when the detected voice segment partly includes a silent segment, a likelihood used to determine the speaker attribute has been calculated and added up for the silent segment.

DETAILED DESCRIPTION

According to an embodiment, a pattern recognition device includes a receiver, a signal processor, a first recognizer, a detector, and a second recognizer. The receiver is configured to receive a time-series signal. The signal processor is configured to calculate a feature of the time-series signal for each frame. The first recognizer is configured to recognize which of a leaf class and a single class of a first class group the time-series signal belongs to for each frame on the basis of the feature and output a recognition result. The first class group includes a first target class represented by a tree structure and a first non-target class not represented by a tree structure. The first target class includes a plurality of leaf classes assigned to, respectively, a plurality of leaves and a node class assigned to a node. The first non-target class includes the single class. The detector is configured to detect a segment including a first target class on the basis of a sum of probabilities of the leaf classes which the frame belongs to on the basis of the recognition results for each frame. The second recognizer is configured to recognize which of a plurality of second target classes of a second class group the segment belongs to on the basis of the recognition results for the frames within the segment detected by the detector.

A preferred embodiment of a pattern recognition device according to the present invention will be described below in detail with reference to the drawings.

Note that while the pattern recognition device recognizing an attribute of a speaker will be described below as an example, a device to which the embodiment can be applied is not limited to the pattern recognition device. Moreover, there will be described an example in which a gender is recognized as a speaker attribute, where the generality of the present embodiment will not be lost even when another speaker attribute is to be recognized. The other speaker attribute includes an age, a generation, emotion such as anger and sorrow, laughter, a cough, a speaker, and a voice itself, for example.

According to the aforementioned speaker attribute recognition device which has been used in the related art to detect a voice segment and recognize the speaker attribute of the segment of a frame by the same recognizer, a likelihood used to determine the speaker attribute has been calculated and added for a silent segment which is in some cases partly included in the voice segment being detected. Moreover, a recognition problem pertaining to a frame is solved by using the likelihood of a generated model and has not been solved directly by using a probability.

The pattern recognition device according to the present embodiment performs recognition processing on a frame and uses a result of the processing to be able to accurately detect the voice segment and recognize the speaker attribute of the segment with use of a probability of each class for the frame.

Figure 1:
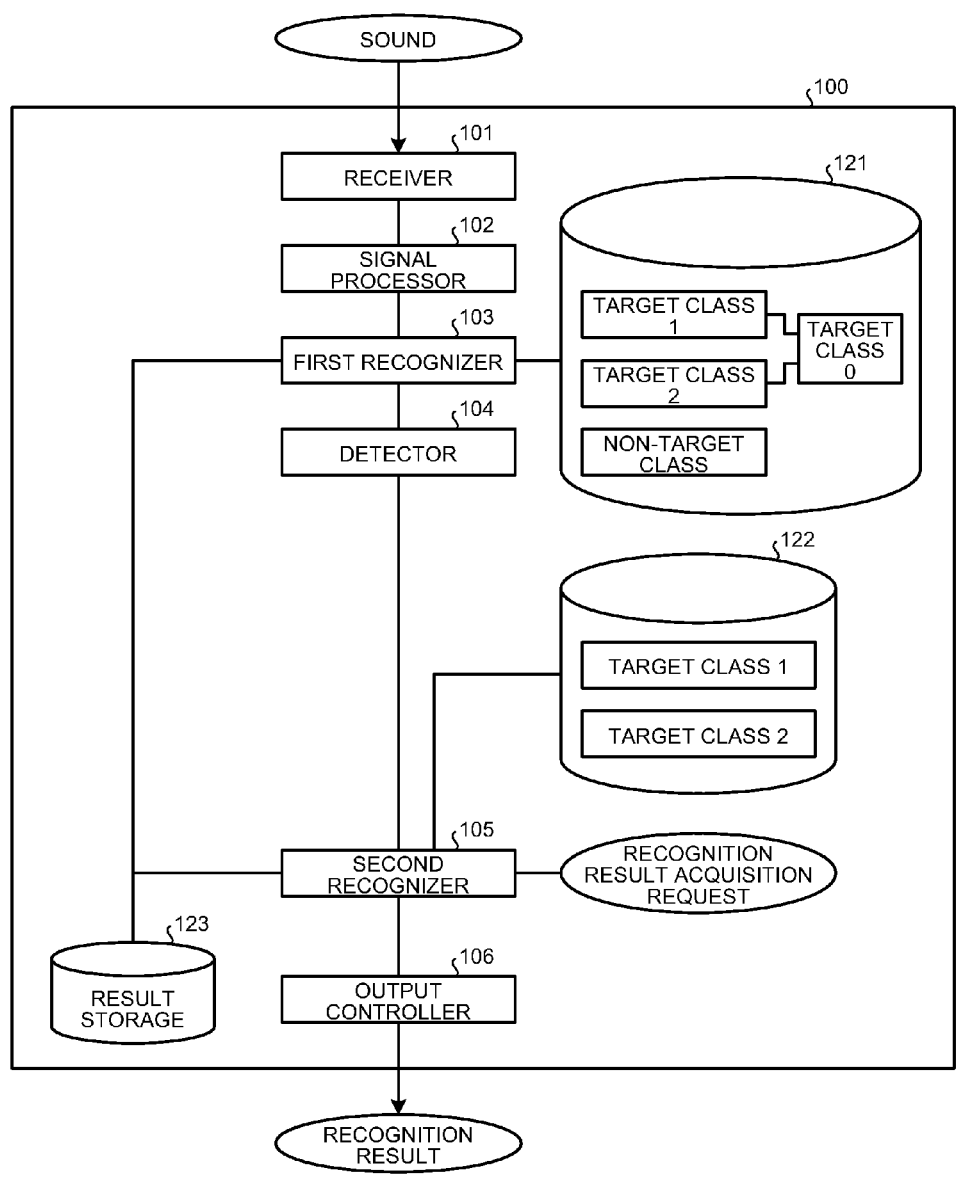
FIG. 1 is a block diagram of a pattern recognition device according to the present embodiment.

FIG. 1 is a block diagram illustrating a pattern recognition device 100 according to the present embodiment. The pattern recognition device 100 includes recognizer storages 121 and 122, a result storage 123, a receiver 101, a signal processor 102, a first recognizer 103, a detector 104, a second recognizer 105, and an output controller 106.

The recognizer storage 121 stores information on a recognizer used by the first recognizer 103. The recognizer storage 122 stores information on a recognizer used by the second recognizer 105. When the first recognizer 103 and the second recognizer 105 perform recognition processing by using a recognizer in a neural network (such as a DNN (Deep Neural Network)), for example, each of the recognizer storages 121 and 122 stores information on the corresponding recognizer in the neural network being used.

The result storage 123 stores a result (recognition result) of the recognition processing performed by the first recognizer 103 and the second recognizer 105.

Note that each of the storages (the recognizer storages 121 and 122 and the result storage 123) can be configured by various storage mediums used in general such as an HDD (Hard Disk Drive), an optical disk, a memory card, and a RAM (Random Access Memory).

The receiver 101 receives an input of a time-series signal (such as a sound). The receiver 101 performs analog-to-digital conversion on a sound waveform of the received sound and outputs the outcome to the signal processor 102. The receiver 101 employs general AD (analog-digital) conversion to convert an analog wave into a digital wave. The receiver 101 samples an analog sound waveform at 16 kHz and outputs a digital signal in which an amplitude value of one sample is expressed in 16 bits, for example.

The signal processor 102 extracts the digital sound waveform as a frame every fixed period of time and calculates a sound feature for every frame. The signal processor 102 extracts the digital sound waveform every 256 point sample with a shift of a 128 point sample and makes it a single frame, for example. The signal processor 102 calculates a 12-dimensional MFCC (Mel Frequency Cepstral Coefficient) feature from the 256 point sample (one frame). The signal processor 102 buffers three frames of the MFCC feature and outputs a 36-dimensional feature formed by connecting the three frames of the MFCC feature as a time feature of a central frame among the three frames.

The extracted feature is not limited to the MFCC where, for example, it may be adapted to use a Mel filter bank feature, a PLP (Perceptual Linear Prediction) or RASTA-PLP feature, a pitch feature, and a A component or a AA component of those features. A combination of those features may be used as well. Moreover, the number of frames connected is not limited to three frames, where any number of frames may be connected as long as there is one frame or more. Furthermore, the extracted sample size and the frame period are not limited to the aforementioned values.

The first recognizer 103 recognizes for each frame whether the sound belongs to a leaf class or a single class in a predetermined class group (first class group) on the basis of the calculated feature, and calculates a probability of each class when the frame is given. The first class group has at least one or more tree structure classes and includes a class being a recognition target (first target class) and a class not being the first target class (first non-target class). The tree structure class is a class represented by a tree structure. The leaf class is a class corresponding to a leaf node in the tree structure class. A class corresponding to a node other than the leaf node in the tree structure class will be hereinafter referred to as a node class. The single class is a class not represented by the tree structure (class that is not the tree structure class).

The first target class includes the tree structure class with the leaf class corresponding to a class indicating a male voice and a class indicating a female voice as well as the node class corresponding to a voice class, for example. The first non-target class includes a class indicating silence. The first recognizer 103 stores the recognition result being output in the result storage 123.

The first recognizer 103 performs the recognition processing with reference to the information stored in the recognizer storage 121. FIG. 1 illustrates an example where the recognizer storage 121 stores the information used to recognize the leaf class and the single class, the single class being a single non-target class (such as a silence class), the tree structure class having a target class 0 (such as a voice class) being a target class as the node class and two target classes including a target class 1 (such as a male voice class) and a target class 2 (such as a female voice class) as the leaf class.

The detector 104 calculates the sum of probabilities of the leaf class in the tree structure class to be the first target class of the first recognizer 103, and uses the calculated sum to detect a segment including the first target class. The detector 104 then determines and outputs the segment in which the first target class is present.

The second recognizer 105 recognizes which second class group the sound belongs to on the basis of the recognition result output by the first recognizer 103 with respect to one or more frames. The second class group includes at least a second target class to be the recognition target. The second target class includes the class indicating the male voice and the class indicating the female voice, for example. As a result, a final recognition result of the attribute (whether the sound is the male voice or the female voice) in the detected segment is output.

The second recognizer 105 performs the recognition processing with reference to the information stored in the recognizer storage 122. FIG. 1 illustrates an example where the recognizer storage 122 stores the information used to recognize the two target classes including the target class 1 (such as the male voice class) and the target class 2 (such as the female voice class).

The sound segment to be processed by the second recognizer 105 is the segment detected by the detector 104. It may be configured to accept a request to acquire the recognition result when 1 of signals 0 and 1 is input from outside, for example. The signal is 1 when the user clicks a button to request the recognition result and 0 in another state, for example. At this time, the first target class in the first class group or the second target class in the second class group to be detected may be changed according to the signal requesting the acquisition of the recognition result.

The class included in the first class group and the second class group is not limited to the aforementioned example. The second class group may include a non-target class (second non-target class) indicating the silence, for example. Moreover, the first class group and the second class group may be the same class group or different class groups.

The output controller 106 controls output processing of various information. The output controller 106 outputs the final recognition result provided by the second recognizer 105, for example. The information may be output by any method including a method of displaying the information on a display device (not shown) and a method of outputting the information to an external device through a network or the like, for example.

Note that each of the aforementioned units (the receiver 101, the signal processor 102, the first recognizer 103, the second recognizer 105, the detector 104, and the output controller 106) may be realized by a processor such as a CPU (Central Processing Unit) running a program, namely by software, or may be realized by hardware such as an IC (Integrated Circuit) or a combination of the software and the hardware.

Figure 2:
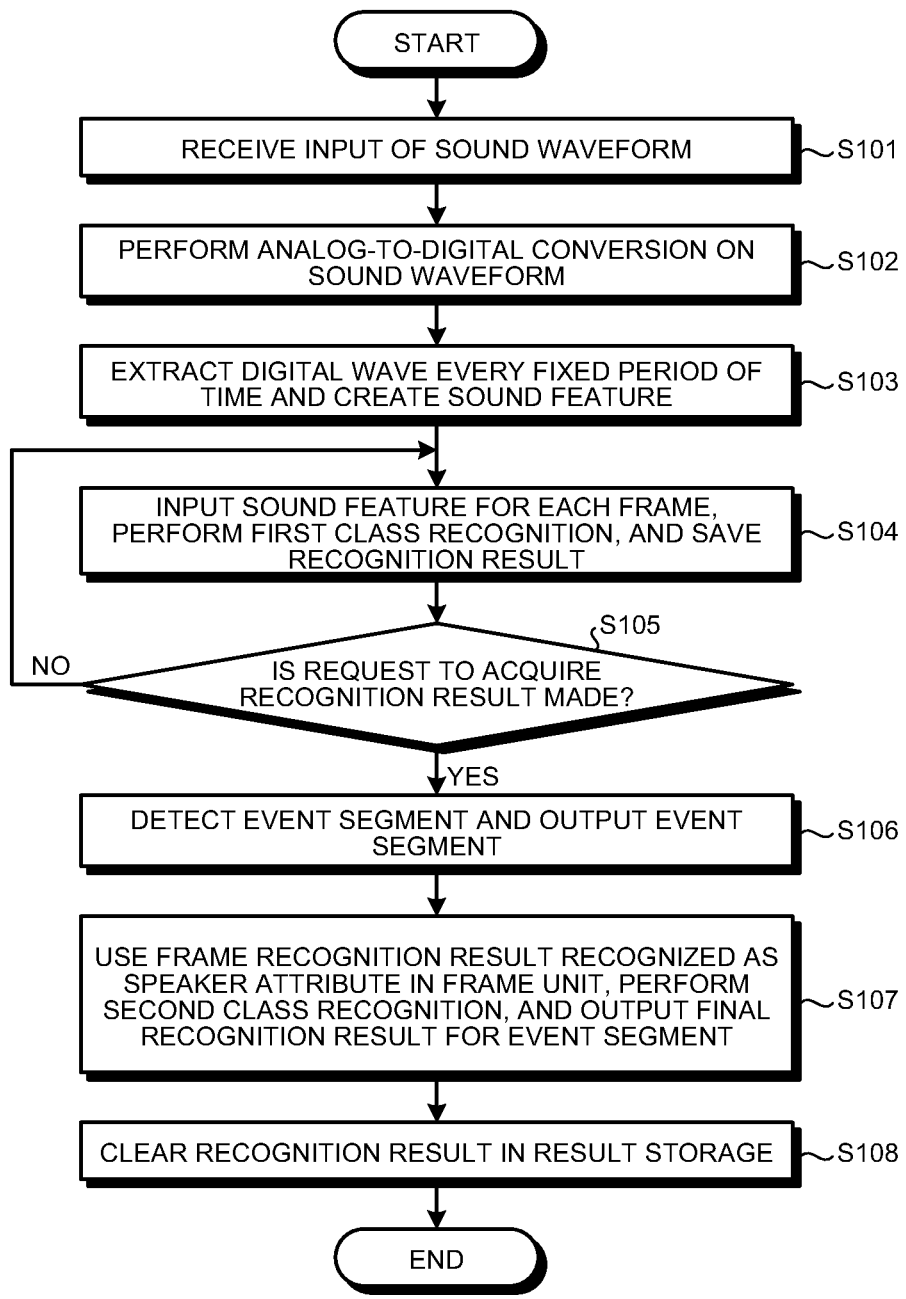
FIG. 2 is a flowchart of pattern recognition processing according to the present embodiment.

Next, pattern recognition processing performed by the pattern recognition device 100 having the aforementioned configuration according to the present embodiment will be described with reference to FIG. 2. FIG. 2 is a flowchart illustrating an example of the pattern recognition processing according to the present embodiment.

First, the receiver 101 receives the input of a sound waveform (step S101). The sound waveform is a piece of information recorded by using a microphone, for example. The receiver 101 performs the analog-to-digital (digital wave) conversion on the sound waveform (step S102).

The signal processor 102 extracts the digital wave every fixed period of time and creates a sound feature (step S103).

The first recognizer 103 inputs the sound feature output by the signal processor 102 and uses the recognizer stored in the recognizer storage 121 to perform first class recognition processing. The first recognizer 103 then stores the recognition result in the result storage 123 (step S104). The class recognized in the first class recognition processing includes three classes including the male voice class and the female voice class being the class (first target class) as a speaker attribute as well as the silence class being the class (first non-target class) that is not the speaker attribute. The male voice class and the female voice class have the class structure corresponding to the tree structure, where the leaf class corresponds to the male voice class and the female voice class while the node class to which the leaf class is connected corresponds to the voice class. The first recognizer 103 uses a DNN stored in the recognizer storage 121 to recognize the three classes including the male voice class and the female voice class being the leaf class and the silence class being the single class that does not have the tree structure, and outputs an a posteriori probability for each class when the frame is given.

The DNN is constructed such that the number of units of an input layer equals 36 that is the same as the number of dimensions of the feature, the number of units of each of two hidden layers equals 512, and the number of units of an output layer equals three, for example. The output layer in this case corresponds to the male voice class, the female voice class, and the silence class.

Learning of the DNN is executed as follows, for example. There is first prepared a piece of data (learning voice) including a male voice, a female voice, and silence which are labeled a male voice frame, a female voice frame, and a silence frame, respectively. Next, a feature identical to the feature calculated by the signal processor 102 is calculated from the learning voice so that, while using a soft-max (SoftMax) function to the final output layer, the learning of the DNN is performed by using back propagation such that the unit of the output layer corresponding to the label approaches 1 and the output of another unit approaches 0.

The first recognizer 103 uses the DNN that has learned as described above to perform recognition of the three classes including the male voice class, the female voice class, and the silence class. The first recognizer 103 gives the 36 dimensions of the sound feature to the input layer of the DNN, compares the value in the output layer, and outputs a class corresponding to the unit with a large value as the recognition result. The first recognizer 103 further outputs the a posteriori probability for each class.

The recognition result and the a posteriori probability for each class are saved in the result storage 123. The result storage 123 may also store how many times each class is output as the recognition result.

The first class group is not limited to the class configuration including the tree structure class with the voice class corresponding to the node class and the male voice class and the female voice class corresponding to the leaf class, and the silence being the single class. The speaker attribute class may be further divided into a plurality of smaller classes, for example, such that there includes the voice class corresponding to the node class, a male consonant voice, a male vowel voice, a female consonant voice, and a female vowel voice each corresponding to the leaf class, and the silence being the single class. Moreover, the silence class may be further divided into a plurality of smaller classes such as a spontaneous noise class and a regular silence class that is not classified as the spontaneous noise. The silence class may also have the structure corresponding to the tree structure class with the silence class corresponding to the node class and the spontaneous noise class and the regular silence class corresponding to the leaf class, for example.

The recognizer is not limited to the DNN as long as the recognizer can perform multi-class recognition and output the probability of each class for the frame. Multi-class SVM, likelihood comparison of the mixed GMMs, and multi-class AdaBoost may be used as the recognizer, for example.

The recognition result saved in the result storage 123 may contain not only the a posteriori probability for each frame associated with the frame time but also a likelihood of each class, for example.

The second recognizer 105 determines whether or not a request to acquire the recognition result is made (step S105). When the request to acquire the recognition result is not made (step S105: No), the processing is repeated by returning to step S104.

When the request to acquire the recognition result is made (step S105: Yes), the detector 104 uses the recognition result output by the first recognizer 103 to detect the segment of the voice class (step S106). At this time, the plausibility of voice for each frame is expressed by the probability of the voice class, or the sum of the probability of the male class and the probability of the female class corresponding to the leaf class. In this case, the plausibility of voice may be expressed solely by the probability of the silence class. The detector 104 performs smoothing processing and threshold processing on the plausibility of voice with respect to the frame and detects the voice segment (event segment). The detector 104 detects a segment where the sum of the probabilities is larger than a threshold as the voice segment, for example. The result output by the first recognizer may be buffered in performing the detection.

The voice segment may be detected by another method such as a method of determining a start end and a terminal by using automaton. Moreover, the segment detected by the detector 104 may be subjected to voice recognition processing. The voice recognition processing can be performed by processing the sound with a method in which a general HMM (Hidden Marcov Model) and the GMMs are combined or a method in which the HMM and the DNN are combined and processing the language with an N-gram language model and an RNN (Recurrent Neural Networks). Moreover, the segment need not be detected by one detector where detection processing may be performed on each of a plurality of targets of the first target class in the first class group. When the first class group has two tree structure class groups including a tree structure class group with the voice class corresponding to the node class and the male voice class and the female voice class corresponding to the leaf class, and a tree structure class group with a music class corresponding to the node class and a classical class and a rock class corresponding to the leaf class, for example, a segment corresponding to each of the voice and the music may be detected based on a posteriori probabilities of the leaf classes in each tree structure and calculating each of the probability of the voice and the probability of the music.

The second recognizer 105 uses the recognition result saved in the result storage 123 and recognized by the unit of frame to execute second class recognition processing on the segment detected by the detector 104 and outputs the recognition result (step S107).

The second recognizer 105 recognizes two classes including the male voice class and the female voice class. The result storage 123 stores the probability of each of the male voice, the female voice, and the silence in association with the frame time. The second recognizer 105 then compares the a posteriori probabilities of the male voice, the female voice, and the silence for each frame and determines the largest probability to be the recognition result of that frame. The second recognizer 105 compares the number of frames recognized to be the male voice class and the number of frames recognized to be the female voice class, and outputs the class having the larger number of frames as a final recognition result.

After the recognition result is output, the second recognizer 105 resets (clears) the recognition result saved in the result storage 123 (step S108).

The second recognizer 105 may recognize not only the aforementioned classes but also the male class, the female class, and the silence as the first recognizer 103 does. Moreover, the second recognition may be performed not only on the single segment detected but a plurality of segments being detected.

Furthermore, the second recognizer 105 may recognize the speaker attribute different from the attribute recognized by the first recognizer 103 such as when the first class group includes a class corresponding to each of a cough, a snuffling sound, the male voice, and the female voice while the second class group includes a class corresponding to each of a male having a cold, a female having a cold, a male in good health, and a female in good health, for example.

The request to acquire the recognition result may be made in a manner different from what is described above. The request to acquire the result may be made every time the frame is processed without resetting the result storage 123, for example. Moreover, the request to acquire the result may be made for an event segment at a timing when the terminal of the segment is detected by the detector 104. The result storage 123 does not necessarily have to be reset at a timing after outputting the recognition result. When the pattern recognition device of the present embodiment is applied to a telephone, for example, the result storage may be reset at a timing when one phone call is terminated.

The recognizer used by the second recognizer 105 may be any recognizer as long as it is adapted to input the recognition result output by the first recognizer 103 for each frame. The determination by the second recognizer 105 may be made not only on the basis of the number of counts but the degree of likelihood and a posteriori probability, for example. The second recognizer 105 may also output an N-best output of the value of the number of counts, the likelihood, and the a posteriori probability as the recognition result. The result may be also output for each segment which is further divided in the segment detected by the detector 104.

Figure 3:
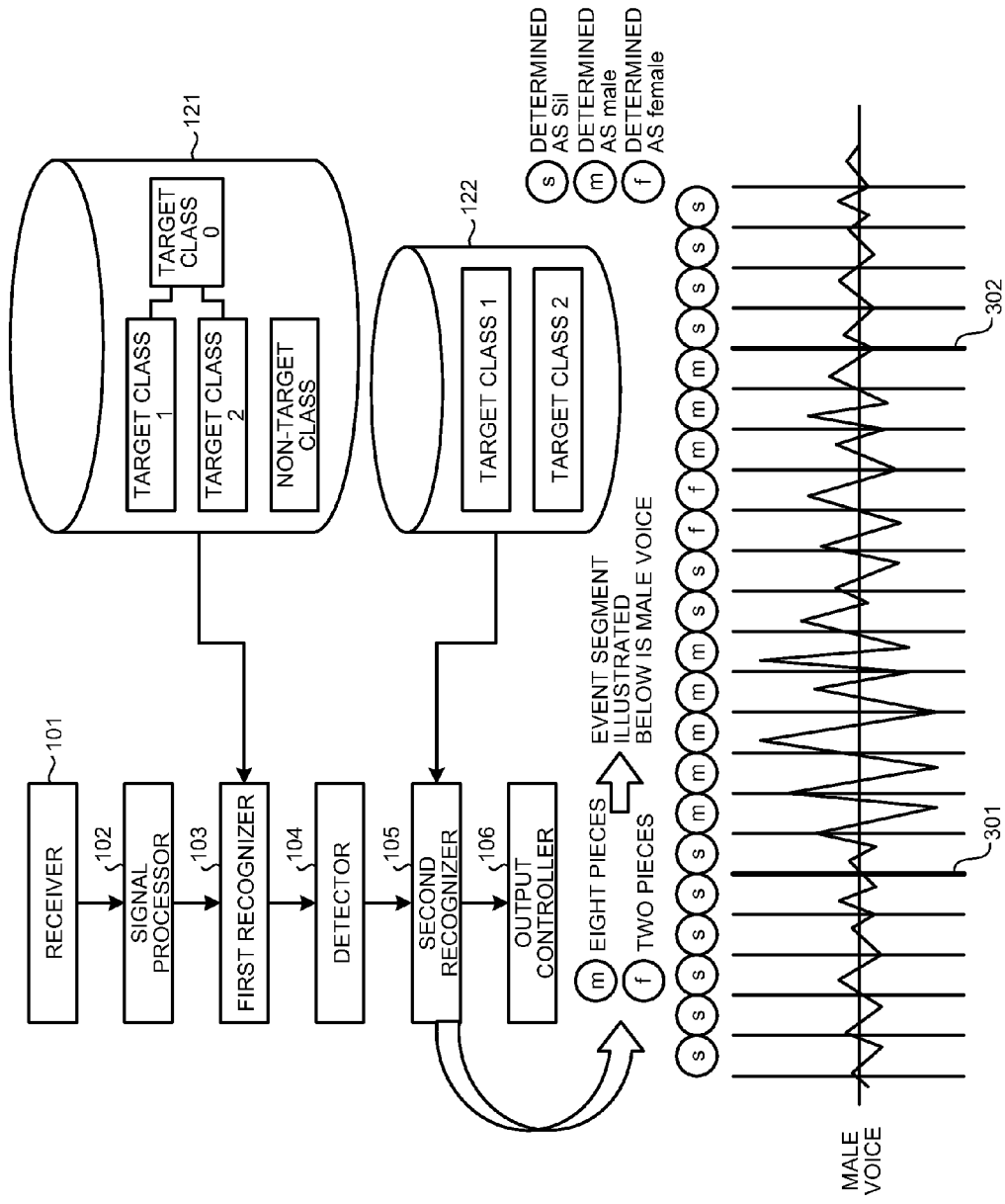
FIG. 3 is a diagram illustrating a specific example of the pattern recognition processing according to the present embodiment.

FIG. 3 is a diagram illustrating a specific example of the pattern recognition processing according to the present embodiment. In FIG. 3 where the leaf class corresponds to the target class 1 (such as the male voice (male)) and the target class 2 (such as the female voice (female)) with the node class thereof corresponding to the target class 0 while the single class corresponds to the non-target class (such as the silence (Sil)), the first recognizer 103 performs recognition of three classes including the leaf classes (male, female) and the single class (Sil). The second recognizer 105 performs recognition of two classes including the target class 1 (such as the male voice (male)) and the target class 2 (such as the female voice (female)).

A graph illustrated at the bottom of FIG. 3 represents an example of the sound waveform in the sound segment including a plurality of frames. The unit sectioned by a vertical line represents one frame. Symbols "s", "m", and "f" illustrated above each frame indicate that the first recognizer 103 has recognized the corresponding frame to be the silence class, the male voice class, and the female voice class, respectively. In this example, out of the total of 13 frames (frames between a start end 301 and a terminal 302) detected as the voice segment by the detector 104, eight frames are recognized to be the male voice while two frames are recognized to be the female voice.

Referring to the recognition result of each frame output by the first recognizer 103 and detecting the event segment, the second recognizer 105 determines, in the event segment, the male voice "m" largest in number among the frames excluding the silence "s" as the final recognition result in the sound segment illustrated in FIG. 3.

According to the pattern recognition device of the present embodiment, the first recognizer 103 recognizes the male voice, the female voice, and the silence in each frame, the detector 104 uses the first recognition result to detect the voice segment, and the second recognizer 105 performs the second recognition processing on the segment detected by the detector 104 by using the first recognition result recognized to be the male voice and the female voice by the unit of frame and then outputs the final recognition result. At this time, the pattern recognition device of the present embodiment can accurately detect and recognize the target voice segment and the speaker attribute on the basis of the probability of each class in the frame. This allows the speaker attribute to be recognized accurately on the basis of the probability of each class in the frame.

Figure 4:
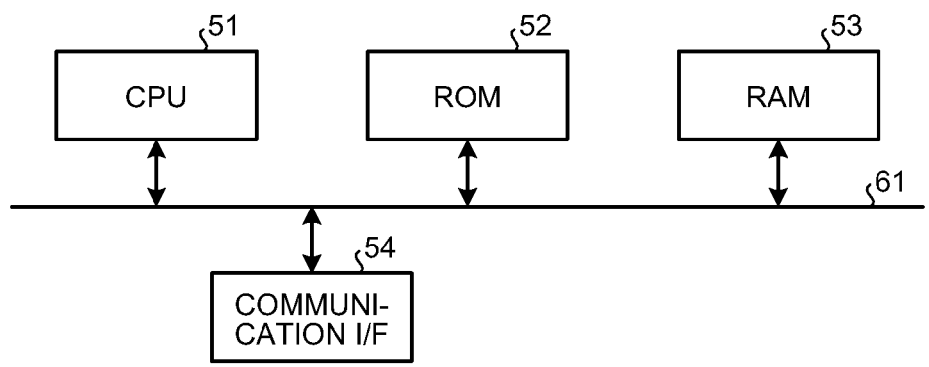
FIG. 4 is a diagram illustrating a hardware configuration of the pattern recognition device according to the present embodiment.

Next, a hardware configuration of the pattern recognition device according to the present embodiment will be described with reference to FIG. 4. FIG. 4 is a diagram illustrating the hardware configuration of the pattern recognition device according to the present embodiment.

The pattern recognition device according to the present embodiment includes a controller such as a CPU (Central Processing Unit) 51, storages such as a ROM (Read Only Memory) 52 and a RAM (Random Access Memory) 53, a communication I/F 54 which performs communication by connecting to a network, and a bus 61 connecting each unit.

A program run by the pattern recognition device of the present embodiment is provided while incorporated in advance in the ROM 52 or the like.

The program run by the pattern recognition device of the present embodiment may be configured to be provided as a computer program product while recorded in a computer-readable recording medium such as a CD-ROM (Compact Disk Read Only Memory), a flexible disk (FD), a CD-R (Compact Disk Recordable), or a DVD (Digital Versatile Disk), the program having an installable or executable file format.

Moreover, the program run by the pattern recognition device of the present embodiment may be stored on a computer connected to a network such as the Internet and provided by downloading via the network. The program run by the pattern recognition device of the present embodiment may also be provided or distributed via the network such as the Internet.

The program run by the pattern recognition device of the present embodiment can cause a computer to function as each unit of the aforementioned pattern recognition device. The computer can operate when the CPU 51 reads the program from a computer-readable storage medium to a main storage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pattern recognition device comprising:
   a receiver configured to receive a time-series signal;
   a signal processor configured to calculate a feature of the time-series signal for each frame;
   a first recognizer configured to recognize which of a leaf class and a single class of a first class group the time-series signal belongs to for each frame on the basis of the feature and output a recognition result, the first class group including a first target class represented by a tree structure and a first non-target class not represented by a tree structure, the first target class including a plurality of leaf classes assigned to, respectively, a plurality of leaves and a node class assigned to a node, the first non-target class including the single class;
   a detector configured to detect a segment including a plurality of frames on the basis of the recognition result, a sum of probabilities of the leaf classes to each of which each of the plurality of frames belongs being larger than a threshold;
   a second recognizer configured to recognize which of a plurality of second target classes of a second class group the segment belongs to on the basis of the recognition results for the frames within the segment detected by the detector, wherein the time-series signal is a sound signal; and
   a display device configured to display the final recognition result provided by the second recognizer.

2. The device according to claim 1, wherein the first target class has a plurality of tree structure class groups.

3. The device according to claim 2, wherein the detector is configured to calculate the sum for each of the plurality of tree structure class groups, and detect a segment including a plurality of frames that belong to a node class of each tree structure class on the basis of the sum.

4. The device according to claim 1, wherein the first target class has a single class and at least one of tree structure class groups.

5. The device according to claim 4, wherein the detector is configured to calculate the sum for each of the at least one of tree structure class groups, detect a segment including a plurality of frames that belong to a node class of each of the at least one of tree structure class groups, and detect a segment including a plurality of frames that belong to the single class by using a corresponding probability for the single class.

6. The device according to claim 1, wherein the second recognizer is configured to perform the recognition by using only the frames recognized to belong to the first target class by the first recognizer.

7. The device according to claim 1, wherein the second class group further includes a second non-target class that is different from any one of the second target classes.

8. The device according to claim 1, wherein the first non-target class is a class indicating silence.

9. The device according to claim 1, wherein the first recognizer is configured to use a neural network to output a probability that each frame belongs to a class included in the first class group.

10. The device according to claim 1, wherein
    information on the segment detected by the detector is used in voice recognition processing that converts a voice into a character.

11. The device according to claim 1, further comprising a result storage configured to store the recognition result, wherein
    the second recognizer is configured to recognize which of the plurality of second target classes on the basis of the recognition result stored in the result storage.

12. The device according to claim 1, wherein the first class group and the second class group are the same.

13. The device according to claim 1, wherein the first class group and the second class group are different.

14. The device according to claim 1, wherein the plurality of second target classes is the plurality of leaf classes.

15. A pattern recognition method comprising:
    receiving an input of a time-series signal; calculating a feature of the time-series signal for each frame;
    recognizing which of a leaf class and a single class of a first class group the time-series signal belongs to for each frame on the basis of the feature and output a recognition result, the first class group including a first target class represented by a tree structure and a first non-target class not represented by a tree structure, the first target class including a plurality of leaf classes assigned to, respectively, a plurality of leaves and a node class assigned to a node, the first non-target class including the single class;
    detecting a segment including a plurality of frames on the basis of the recognition result, a sum of probabilities of the leaf classes to each of which each of the plurality of frames belongs being larger than a threshold;
    recognizing which of a plurality of second target classes of a second class group the segment belongs to on the basis of the recognition results for the frames within the detected segment, wherein the time-series signal is a sound signal; and
    displaying the final recognition result provided by the second recognizer.

16. A computer program product comprising a non-transitory computer-readable medium containing a program executed by a computer, the program causing the computer to execute:
    receiving a time-series signal;
    calculating a feature of the time-series signal for each frame;
    recognizing which of a leaf class and a single class of a first class group the time-series signal belongs to for each frame on the basis of the feature and output a recognition result, the first class group including a first target class represented by a tree structure and a first non-target class not represented by a tree structure, the first target class including a plurality of leaf classes assigned to, respectively, a plurality of leaves and a node class assigned to a node, the first non-target class including single class;

detecting a segment including a plurality of frames on the basis of the recognition result, a sum of probabilities of the leaf classes to each of which each of the plurality of frames belongs being larger than a threshold;

recognizing which of a plurality of second target classes of a second class group the segment belongs to on the basis of the recognition results for the frames within the detected segment, wherein the time-series signal is a sound signal; and displaying the final recognition result provided by the second recognizer.

* * * * *